(12) United States Patent
Li et al.

(10) Patent No.: US 9,308,991 B2
(45) Date of Patent: Apr. 12, 2016

(54) STRUT LENGTH AND PRESSURE REGULATION SYSTEM

(71) Applicant: Goodrich Corporation, Charlotte, NC (US)

(72) Inventors: Chi Shing Li, Ontario (CA); Marco Perrella, Mississauga (CA)

(73) Assignee: Goodrich Corporation, Charlotte, NC (US)

( * ) Notice: Subject to any disclaimer, the term of this patent is extended or adjusted under 35 U.S.C. 154(b) by 185 days.

(21) Appl. No.: 14/308,162

(22) Filed: Jun. 18, 2014

(65) Prior Publication Data

US 2015/0367933 A1    Dec. 24, 2015

(51) Int. Cl.
| | |
|---|---|
| *G01C 23/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B64C 25/62* | (2006.01) |
| *B64C 25/22* | (2006.01) |
| *B64C 25/60* | (2006.01) |
| *F16F 9/02* | (2006.01) |

(52) U.S. Cl.
CPC ............... *B64C 25/62* (2013.01); *B64C 25/22* (2013.01); *B64C 25/60* (2013.01); *F16F 9/0209* (2013.01); *F16F 9/0245* (2013.01)

(58) Field of Classification Search
CPC ........ B64C 25/62; B64C 25/22; B64C 25/60; F16F 9/0245; F16F 9/0209
USPC ............................................................ 701/3
See application file for complete search history.

(56) References Cited

U.S. PATENT DOCUMENTS

| | | |
|---|---|---|
| 2010/0037957 A1 | 2/2010 | Tabelander et al. |
| 2012/0053783 A1 | 3/2012 | Nance |

FOREIGN PATENT DOCUMENTS

| | | |
|---|---|---|
| EP | 0365317 | 4/1990 |
| WO | 2008063685 | 5/2008 |

OTHER PUBLICATIONS

Extended European Search Report dated Oct. 28, 2015 in European Application No. 15171673.5.

*Primary Examiner* — Maceeh Anwari
(74) *Attorney, Agent, or Firm* — Snell & Wilmer, L.L.P.

(57) ABSTRACT

A strut length and pressure regulation system is disclosed. The system may regulate the length of a strut by controlling the amount of gas in the strut. The system may monitor the length of the strut and/or pressure of gas in the strut and may change the amount of gas in the strut in response to the length of the strut and/or pressure of gas in the strut. In this manner, the effects of temperature changes may be compensated.

14 Claims, 6 Drawing Sheets

STRUT LENGTH AND PRESSURE REGULATION SYSTEM

FIELD

The present disclosure relates to landing gear systems and, more specifically, to a system to regulate the length and pressure of the landing gear shock strut.

BACKGROUND

Aircraft landing gear often includes shock struts. A shock strut often contains gas and/or oil and provides shock absorption to the landing gear. However, temperature variations have an adverse effect on the shock strut because they change the pressure at which the gas is maintained. This change alters the resting length/internal pressure of the shock strut, and thus the performance characteristics of the shock strut.

SUMMARY

A strut length and pressure regulation system is disclosed. A strut length and pressure regulation system may have a pressure source having a gas reservoir, a valve configured to selectively connect the pressure source in fluidic communication with a strut, and a valve control apparatus configured to actuate the valve in response to position data.

A method of strut length and pressure regulation is disclosed. A method of strut length and pressure regulation may include receiving, at a controller, a position signal, receiving, at the controller, a pressure signal, and controlling, by a valve control apparatus in electrical communication with the controller, a first strut length of a strut in response to at least one of the position signal or the pressure signal.

BRIEF DESCRIPTION OF THE DRAWINGS

The subject matter of the present disclosure is particularly pointed out and distinctly claimed in the concluding portion of the specification. A more complete understanding of the present disclosure may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. As used herein, phrases such as "make contact with," "coupled to," "touch," "interface with" and "engage" may be used interchangeably. As used herein, to be connected in "fluid communication" or "fluidic communication" or to be in "fluidic interconnection" means that a passage exists between the connected elements via which a fluid, including a gas and/or a liquid and/or any other non-solid matter, may pass from one connected element to another connected element. As used herein, "electrical communication" or "electrical interconnection" may refer to any electrical, electromagnetic, radiofrequency and/or optical method whereby information may be conveyed.

Figure 1:
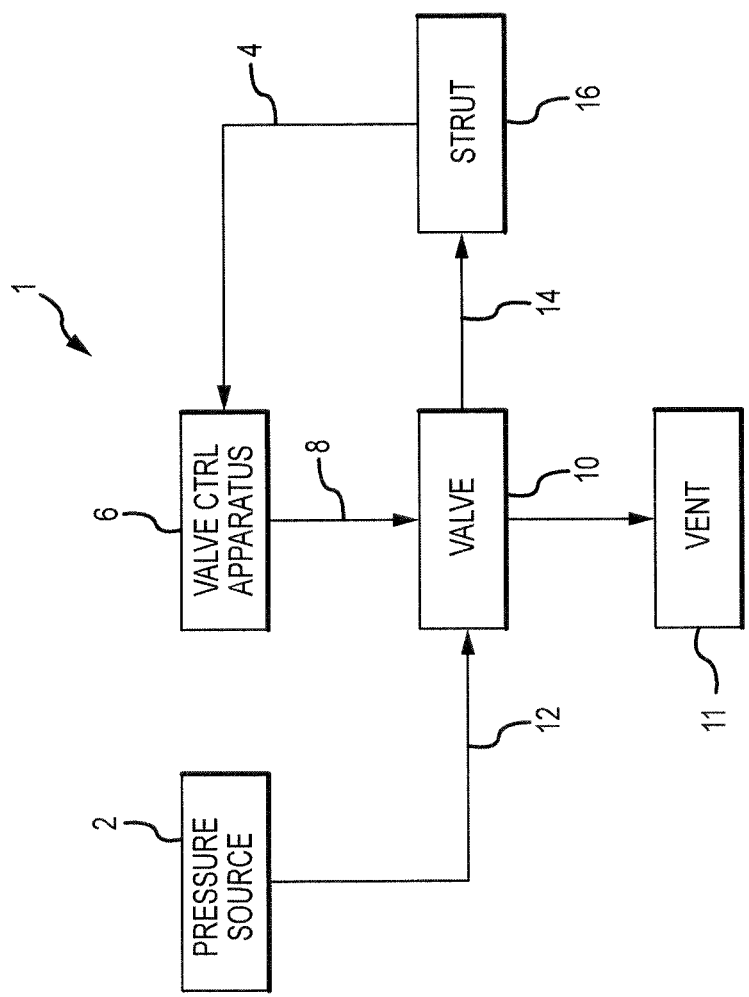
FIG. 1 illustrates a block diagram of various aspects of a strut length and pressure regulation system for landing gear, in accordance with various embodiments.

In various embodiments, and with reference to FIG. 1, a strut length and pressure regulation system 1 may comprise a pressure source 2, a valve control apparatus 6, a valve 10, and a strut 16. The system may operate to increase or decrease the amount of a gas in the strut 16 in order to lengthen or shorten the strut 16 and/or to maintain the air spring of the strut at different operating temperatures. Gas may be directed from the pressure source 2, through the valve 10, and into the strut 16, or gas may be released by the valve 10 from the strut 16 and vented via vent 11 at the direction of the valve control apparatus 6.

A pressure source 2 may comprise a gas reservoir, for example, a storage tank. In various embodiments, the pressure source 2 comprises a nitrogen tank, though the pressure source 2 may also comprise a source of compressed air, such as an air compressor, or any other source whereby gas may be provided at a pressure sufficiently high to flow into the strut 16 in response to a load being placed on the strut 16. In various embodiments, the strut 16 is an aircraft landing gear shock strut, thus the pressure may be sufficiently high to overcome the nominal gas pressure inside the strut 16 when supporting the weight of the aircraft.

A valve 10 may comprise a mechanism whereby the strut 16 may be connected in fluidic communication with one or more gas sources. For example, the valve 10 may be a three position valve. In various embodiments, the valve 10 may be operated to connect the strut 16 in fluidic communication with a pressure source 2, or to connect the strut 16 in fluidic communication with the ambient environment, or may be operated to fluidically isolate the strut 16, disconnecting the strut 16 from fluidic communication with the environment or other systems. As used herein, "close" or "disconnect" means to move toward 100% closed, or disconnected, and "open" or "connect" means to move toward 100% opened.

A vent 11 may comprise any device whereby a fluid may be released. For example, the vent 11 may be an aperture disposed in fluid communication with the ambient environment.

In further embodiments, the vent 11 may comprise a collection reservoir configured to receive waste fluid and/or another aircraft system where the fluid may be repurposed. Thus, the vent 11 may comprise any device whereby gas released from the strut 16 may be purged from the strut length and pressure regulation system 1.

Figure 5:
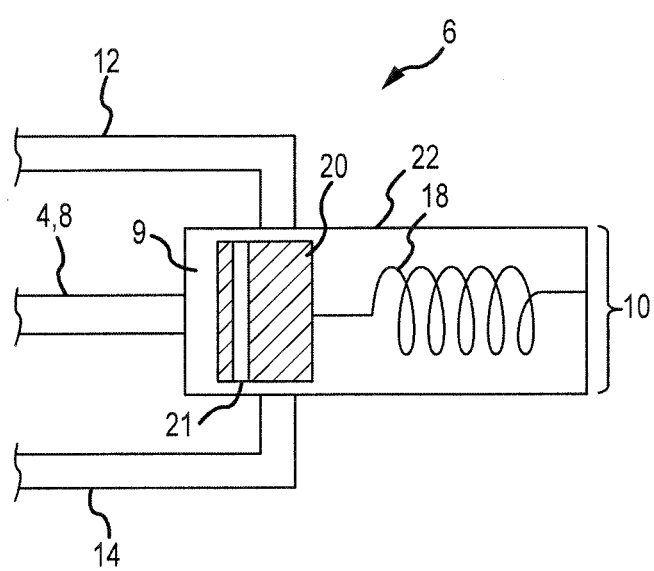
FIG. 5 illustrates a view of various aspects of a mechanical valve control apparatus for a strut length and pressure regulation system, in accordance with various embodiments.

A valve control apparatus 6 may comprise any device whereby the position of the valve 10 may be controlled. For example, with reference to FIG. 2, the valve control apparatus 6 may be electronic. With reference to FIG. 5, the valve control apparatus 6 may be mechanical. Various embodiments of the valve control apparatus 6 are discussed further herein.

With reference back to FIG. 1, a strut 16 may comprise an aircraft landing gear shock strut. A strut 16 may comprise a strut of a nose gear portion of the landing gear, or a strut of a main gear portion of the landing gear, or may comprise various struts of various portions of the landing gear. However, a strut 16 may comprise an automotive strut, or may comprise an industrial strut, or may comprise any strut 16 for which regulation of strut length/pressure is desired.

The strut length and pressure regulation system 1 may comprise various electrical, logical, mechanical, and/or fluidic interconnections. For example, a first valve input interconnection 12 may be disposed between the pressure source 2 and the valve 10. The first valve input interconnection 12 may provide a path for gas to travel from the pressure source 2 to the valve 10. In various embodiments, the first valve input interconnection 12 comprises a tubing. The first valve input interconnection 12 may comprises any apparatus by which the pressure source 2 may be maintained in fluidic communication with the valve 10.

Similarly, the valve 10 may be interconnected with the strut 16. A first valve output interconnection 14 may be disposed between the valve 10 and the strut 16. The first valve output interconnection 14 may provide a path for gas to travel from the valve 10 to the strut 16. In various embodiments, the first valve output interconnection 14 comprises a tubing. The first valve output interconnection 14 may comprise any apparatus by which the strut 16 may be maintained in fluidic communication with the valve 10. The first valve output interconnection 14 provides a path whereby gas may travel from the valve 10 to the strut 16, and by which gas may travel from the strut 16 to the valve 10. In various embodiments, the valve 10 may operate to selectively put the first valve output interconnection 14 in fluidic communication with the first valve input interconnection 12 and/or the surrounding environment.

In various embodiments, a strut condition feedback interconnection 4 may be disposed between the strut 16 and the valve control apparatus 6. The strut condition feedback interconnection 4 may comprise any sensing apparatus whereby the valve control apparatus 6 may receive an indication from the strut 16 of the strut's condition. For example, in various embodiments, the length of the strut 16 may be provided to the valve control apparatus 6. In further embodiments, the pressure of the gas inside the strut 16 may be provided to the valve control apparatus 6. In still further embodiments, the pressure of the gas inside the strut 16 and the length of the strut 16 may be provided to the valve control apparatus 6. The valve control apparatus 6 may send valve control instructions 8 to control the valve 10 in response to this information provided via the strut condition feedback interconnection 4. The strut condition feedback interconnection 4 may comprise an electrical connection to a sensor proximate to the strut 16, or may comprise electrical connections to multiple sensors proximate to the strut 16, or may comprise a fluidic connection to a mechanical device, for example, so that the pressure of the gas inside the strut 16 may be conveyed to the valve control apparatus 6.

Figure 2:
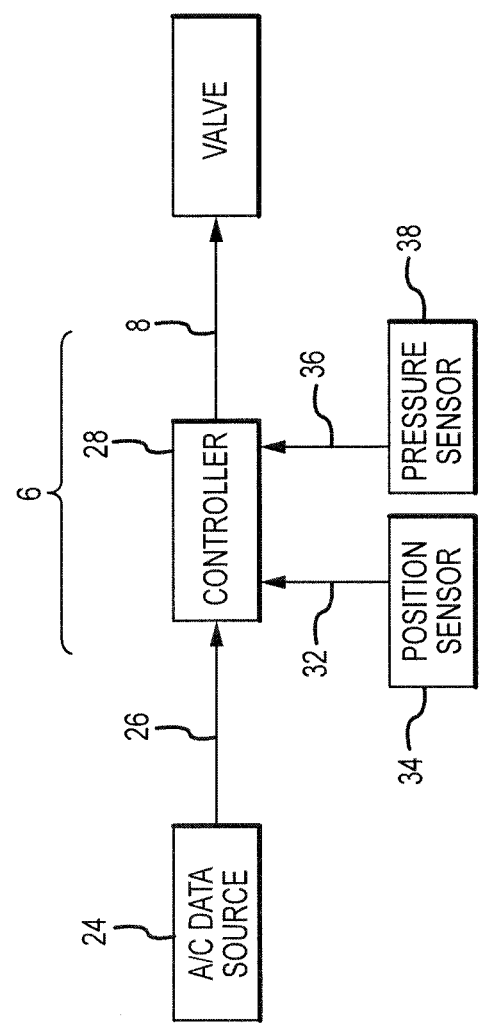
FIG. 2 illustrates a block diagram of various aspects of an electronic valve control apparatus for a strut length and pressure regulation system, in accordance with various embodiments.
Figure 3:
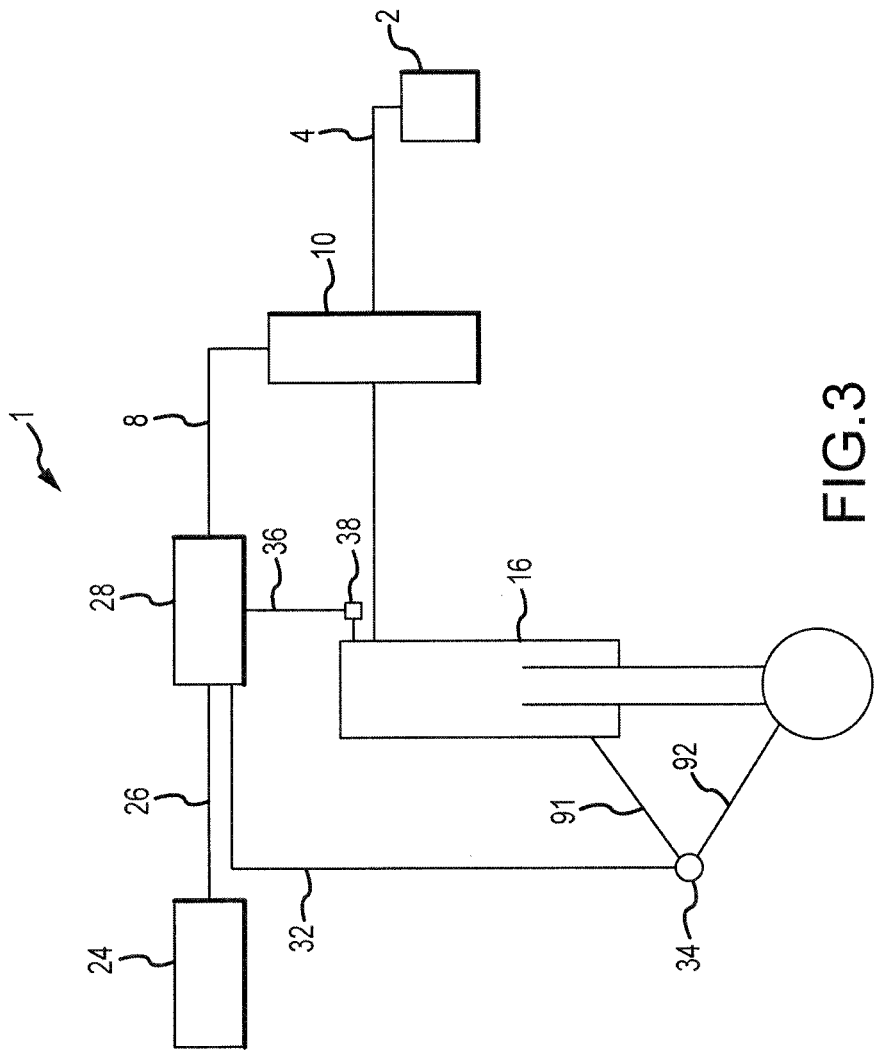
FIG. 3 illustrates a block diagram of various aspects of a strut length and pressure regulation system for landing gear having an electronic valve control apparatus, in accordance with various embodiments.
Figure 4:
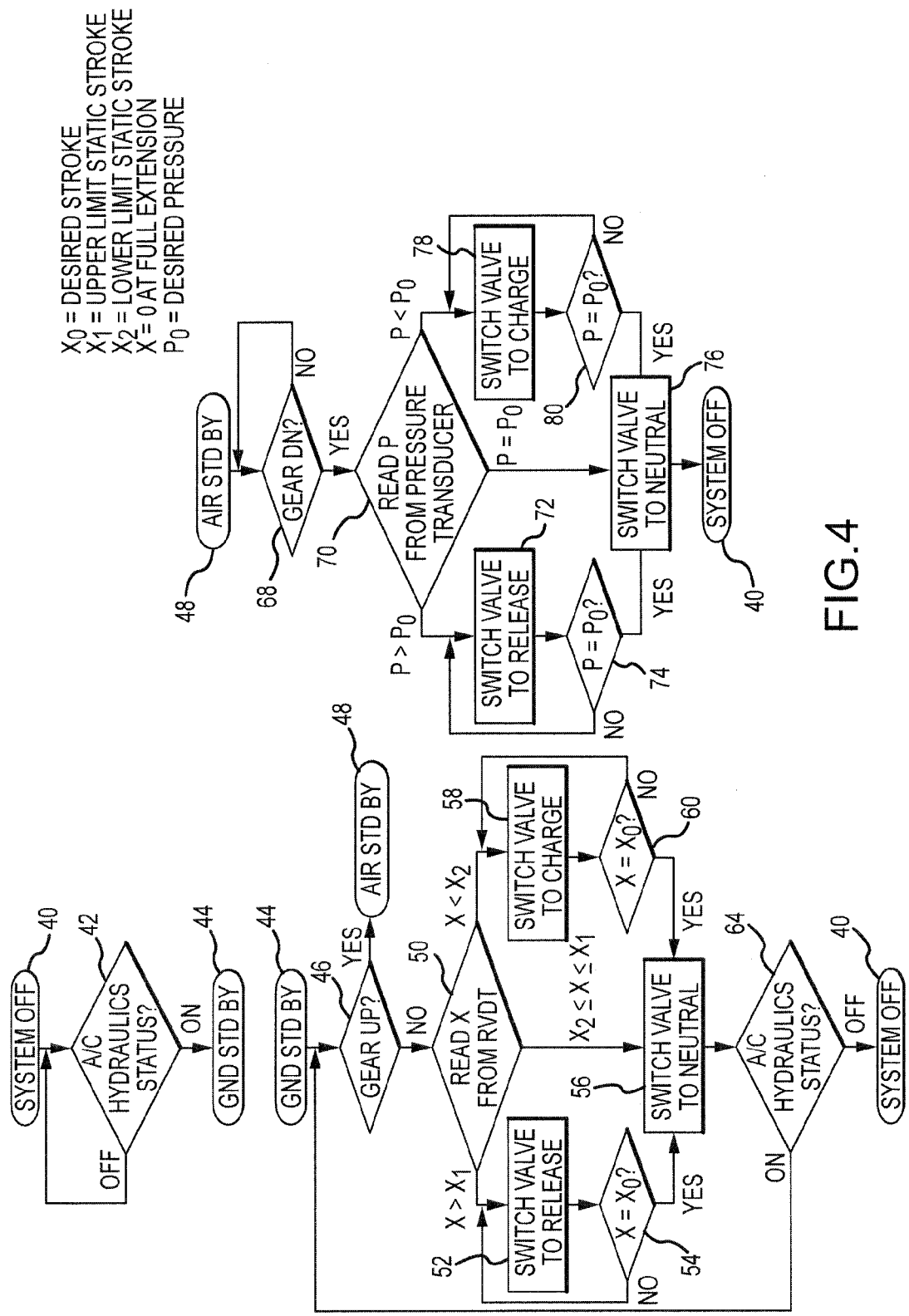
FIG. 4 illustrates a flow chart of various operations performed by an electronic valve control apparatus for a strut length and pressure regulation system, in accordance with various embodiments.

Having discussed various logical and physical relationships among different components of a strut length and pressure regulation system 1, a valve control apparatus 6 may be an electronic valve control apparatus. With reference to FIGS. 2 and 3, the valve control apparatus 6 may comprise a controller 28, a strut position sensor 34, and a strut pressure sensor 38. Controller 28 may have a processor and a tangible, nontransitory memory. The controller 28 may accept various inputs and perform certain logical processes in response to the inputs. The controller 28 may provide various outputs in response to the logical processes. For example, the controller 28 may receive data from the strut position sensor 34 and the strut pressure sensor 38. The controller 28 may control the valve 10 in response to a determination of whether to vary the amount of gas in a strut 16. As will be discussed further herein, several such logical processes for determining whether to vary the amount of gas in a strut 16 are illustrated in FIG. 4.

With continuing reference to FIGS. 2 and 3, the controller 28 may be logical communication with an aircraft data source 24. Logical communication may include electrical, magnetic, radio frequency, and/or optical communication. Logical communication may facilitate the transmission of signals, whether analog or digital, between two or more components.

Aircraft data source 24 may comprise an aircraft data bus, a global positioning system ("GPS"), a full authority digital engine control ("FADEC"), an electronic engine controller ("EEC"), an engine control unit ("ECU"), a flight computer, an airspeed indicator, an altimeter, a weight-on-wheels ("WOW") switch, a parking brake position switch, and/or any other aircraft system, instrument, or data source whereby the status of the aircraft may be determined. The status of the aircraft may include information such as whether an aircraft is parked, taxiing, taking off, climbing, cruising, descending, and/or landing. The status of the aircraft may include information such as whether the aircraft landing gear is extended, whether the aircraft landing gear is retracted, whether the aircraft is on the ground, and whether the aircraft is in the air. Aircraft status information 26 may be provided by aircraft data source 24 to the controller 28. In this manner, the controller 28 may be made aware of the context in which the aircraft is operating.

Controller 28 may also be in logical communication with strut position sensor 34. The controller 28 may receive a position signal 32 from strut position sensor 34 that indicates the length of a strut 16. Similarly, the controller 28 may be in logical communication with strut pressure sensor 38. The controller 28 may receive a pressure signal 36 from the strut pressure sensor 38 that indicates the pressure of a gas inside the strut 16.

In various embodiments, a strut position sensor 34 may comprise a rotary variable differential transformer ("RVDT"). The strut position sensor 34 may be disposed at an articulating joint of an aircraft landing gear torque link. For example, with particular emphasis on FIG. 3, the strut position sensor 34 may be disposed between an upper torque link 91 and a lower torque link 92 of a landing gear at the rotating joint therebetween. In this manner, as the strut 16 compresses and extends, the articulating joint variably rotates. Thus, a rotary variable differential transformer disposed at this articulating joint may determine the length of the strut 16 and may provide a position signal 32 in response. In further embodiments, a strut position sensor 34 may comprise a linear variable differential transformer ("LVDT") disposed parallel to the strut 16 whereby the LVDT may compress and extend in unison with the strut 16. Moreover, a strut position sensor 34 may comprise an optical sensor, or any other sensing device by which the length of the strut 16 may be measured, directly or indirectly, for various landing gear configurations.

In various embodiments, a strut pressure sensor 38 may comprise a piezoelectric pressure transducer, or an electromagnetic pressure sensor wherein the displacement of a diaphragm is measured, or may comprise any type of sensor whereby the pressure of a gas may be determined. The strut pressure sensor 38 may be disposed in fluidic communication with the strut 16. The strut pressure sensor 38 may determine the pressure of the gas within the strut 16 and may provide a pressure signal 36 in response. The strut pressure sensor 38 may comprise any sensing device by which the pressure of the gas in the strut 16 may be measured.

Now, having discussed various structural features of a strut length and pressure regulation system 1, various logical processes for determining whether to vary the amount of gas in a strut 16 are illustrated in FIG. 4. A controller 28 may have logical states. For example, a controller 28 may have a system off state (beginning at step 40), a ground standby state (beginning at step 44), and an air standby state (beginning at step 48). From these states, the controller 28 may make various assessments and take various actions in response to inputs.

With reference to FIGS. 1, 2, and 4, a method for controlling a strut 16 may begin with the system in a system off state (step 40). The controller 28 may receive aircraft status information 26 from an aircraft data source 24 and assess this information to determine the status of the aircraft hydraulic system (step 42). Upon a determination that the aircraft hydraulic system is active, the controller 28 may proceed to a ground standby state (step 44).

A method for controlling a strut may include a ground standby state (step 44). In this state, the controller 28 may assess whether the landing gear is up or down, via receipt of aircraft status information 26. Upon a determination that the landing gear is up, the controller 28 may proceed to an air standby state (step 48). Upon a determination that the landing gear is down, the controller 28 may perform various assessments and take various actions in response to inputs. For example, the controller 28 may determine the length of a strut 16 in response to the position signal 32 from strut position sensor 34 (step 50). The controller 28 may determine if the length of a strut 16 is greater than a pre-programmed upper limit, is less than a pre-programmed lower limit, or is within a pre-programmed upper and lower limit (step 50). The controller 28 may also have a pre-programmed desired stroke length which lies between the upper limit and the lower limit. The controller 28 may take various actions in response to this determining.

If the length is less than the lower limit, the controller 28 may proceed to step 58 and send valve control instructions 8 directing the valve 10 to connect the pressure source 2 to the strut 16 and charge the strut 16 with additional gas. The controller 28 may direct the valve 10 to maintain this connection until the position signal 32 from the strut position sensor 34 indicates (step 60) that the length of the strut 16 is the desired stroke length. Then, the controller 28 may send valve control instructions 8 directing the valve 10 to disconnect the pressure source 2 from the strut 16 and fluidically isolate the strut 16 (step 56).

If the length is greater than the upper limit, the controller 28 may proceed to step 52 and send valve control instructions 8 directing the valve 10 to connect the strut 16 to vent 11, permitting the strut 16 to vent to the ambient environment. The controller 28 may direct the valve 10 to maintain this connection until the position signal 32 from the strut position sensor 34 indicates (step 54) that the length is the desired stroke length. The controller 28 may send valve control instructions 8 directing the valve 10 to fluidically isolate the strut 16 (step 56).

If the length is within the range between the upper limit and the lower limit, the controller 28 may send valve control instructions 8 directing the valve 10 to fluidically isolate the strut 16 (step 56).

Subsequently, the controller 28 may re-assess the status of the aircraft hydraulic system (step 64). Upon a determination that the aircraft hydraulic system is active, the controller 28 may return to step 46. In this manner, the system may continually assess the strut 16 and adjust the gas in the strut 16 to maintain the length of the strut 16 in response to the strut length and pressure regulation system 1 being in the ground standby state.

As discussed above, the system may switch to air standby state (step 48) in response to the aircraft status information 26 indicating that the landing gear is up (step 46). During the air standby state, the strut length and pressure regulation system 1 operates to assess the landing gear status to evaluate whether the gear remains up or is extended down (Step 68). In response to the landing gear being extended, the strut length and pressure regulation system 1 takes additional steps. Because the landing gear is extended in the air when the landing gear is not supporting the weight of the aircraft, maintaining the length of the landing gear may not be priority; however, maintaining an appropriate pressure may be important, for example, to ensure that the strut 16 does not inadvertently lengthen due to environmental temperature/pressure changes and/or to ensure that the strut 16 is properly charged for the initial touchdown. Thus, an air standby state may include the additional methods discussed below.

The controller 28 may determine the pressure of the gas inside of a strut 16 in response to the pressure signal 36 from strut pressure sensor 38 (step 70). The controller 28 may determine if the pressure is greater than a desired pressure, is less than a desired pressure, or equals a desired pressure (step 70). The controller 28 may take various actions in response to this determining. One may appreciate that as used herein, "length regulation" and/or "pressure regulation" and/or "length and pressure regulation" includes the regulation of the length and/or amount of gas in the strut in response to an evaluation of the pressure of the gas in the strut, or the length of the strut, or the pressure of the gas in the strut and the length of the strut, depending on the system state and the various methods discussed herein.

If the pressure is less than the desired pressure, the controller 28 may proceed to step 78 and send valve control instructions 8 directing the valve 10 to connect the pressure source 2 to the strut 16 and charge the strut 16 with additional gas. The controller 28 may direct the valve 10 to maintain this connection until the pressure signal 36 from the strut pressure sensor 38 indicates (step 80) that the pressure equals the desired pressure. Then, the controller 28 sends valve control instructions 8 directing the valve 10 to disconnect the pressure source 2 from the strut 16 and fluidically isolate the strut 16 (step 76).

If the pressure is greater than the desired pressure, the controller 28 may proceed to step 72 and send valve control instructions 8 directing the valve 10 to connect the strut 16 to the ambient environment (e.g., permit the strut 16 to vent). The controller 28 may direct the valve 10 to maintain this connection until the pressure signal 36 from the strut pressure sensor 38 indicates (step 74) that the length is the desired stroke length. The controller 28 may then send valve control instructions 8 directing the valve 10 to fluidically isolate the strut 16 (step 76).

If the pressure is equal to the desired pressure, the controller 28 may send valve control instructions 8 directing the valve 10 to fluidically isolate the strut 16 (step 76). Subsequently the controller 28 may leave the air standby state and return to the system off state (step 40).

Figure 6:
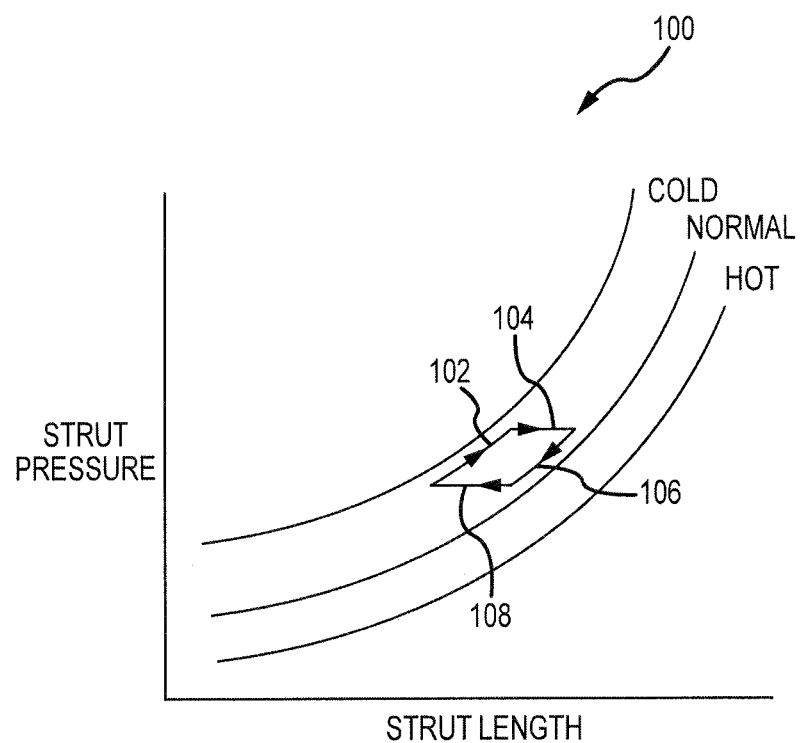
FIG. 6 illustrates chart of various operating characteristics of a strut length and pressure regulation system, in accordance with various embodiments.

Thus, as one may appreciate, depending on different environmental conditions, for example, temperature and/or pressure and/or aircraft weight, the strut 16 may need to be charged with different amounts of gas to maintain a desired length and/or pressure. With reference to FIG. 6, several curves are depicted in a chart 100 showing the relationship between the amount of gas stored in the strut 16 ("strut charge") as indicated by the strut pressure and the strut length. For example, when ambient temperatures change from normal to cold (depicted as cooling line 108), the strut length decreases. To bring the strut length back to the initial magnitude, the amount of gas stored in the strut 16 must be increased (depicted as charging line 102). In the event that the ambient temperatures change again from cold to normal (depicted as heating line 104), the strut length increases. To bring the strut length back to the initial magnitude, the amount of gas stored in the strut 16 must be decreased (depicted as venting line 106). Thus, by assessing the length and/or pressure of the strut 16, the valve control apparatus 6 (FIG. 1) may control the valve 10 (FIG. 1) whereby the amount of gas in the strut 16 is changed responsively.

With reference to FIG. 1 and FIG. 5, in various embodiments, a valve control apparatus 6 comprises a mechanical system integrated with the valve 10, rather than an electronic controller and various sensors (FIG. 2). The valve control apparatus 6 may comprise a housing 22.

The valve 10 may be integrated into this housing 22 and may share components with it. The valve 10 may comprise a floating piston 20 comprising a floating piston passage 21 and connected to a spring 18. The floating piston 20 may translate within the housing 22 alternately blocking a fluidic passage disposed between first valve input interconnection 12 and the first valve output interconnection 14 and aligning the floating piston passage 21 to complete a fluidic passage disposed between first valve input interconnection 12 and the first valve output interconnection 14. In this manner, the valve 10 may be opened and closed.

The valve control apparatus 6 may comprise, in addition to the housing 22, a control reservoir 9 in fluidic communication with the floating piston 20. The valve control apparatus 6 may further comprise an orifice whereby the strut condition feedback interconnection 4 from the strut 16 may put the gas inside the strut 16 into fluidic communication with the floating piston 20. Thus, if the pressure of the gas inside the strut 16 becomes low, the pressure exerted on the floating piston 20 also becomes low and the floating piston 20 translates within housing 22 due to the force exerted by spring 18, unblocking a fluidic passage disposed between first valve input interconnection 12 and permitting gas to flow from pressure source 2 through first valve input interconnection 12, into the valve 10, and out the first valve output interconnection 14 into the strut 16. When the pressure of the gas inside the strut 16 reaches a desired level, the strut condition feedback interconnection 4 from the strut 16 conveys this pressure to the floating piston 20, pushing the floating piston 20 against the spring 18 and translating the floating piston 20, blocking a fluidic passage disposed between first valve input interconnection 12 and first valve output interconnection 14 and preventing gas to flow from pressure source 2. In this manner, a valve control apparatus 6 may comprise a mechanical system. In such an embodiment, the strut condition feedback interconnection 4 comprises a fluidic interconnection between the strut 16 and the control reservoir 9 of the valve control apparatus 6, whereby the valve control instructions 8 operate the translatable floating piston 20. The valve control instructions 8 comprise the pressure of the fluid conveyed by this fluidic interconnection.

Thus, as one having ordinary skill in the art will appreciate, an exemplary embodiment of a strut length and pressure regulation system 1 may comprise combinations of various features from various example embodiments disclosed herein. For example, an exemplary embodiment of a strut length and pressure regulation system 1 may comprise a valve control apparatus 6 and valve 10 according to FIG. 2, or according to FIG. 5, or according to various other arrangements, for example, according to a combination of that disclosed in FIGS. 2 and 5 or portions of that disclosed in FIGS. 2 and 5. For example, a valve control apparatus 6 may comprise an electronic valve control apparatus of FIG. 2, but the strut pressure sensor 38 may be omitted and a second valve control apparatus comprising that of FIG. 5 may also be implemented. These and another combinations, arrangements, and embodiments of features disclosed herein are possible, as appreciated by one having ordinary skill in the art. Moreover, a strut length and pressure regulation system 1 may be combined with various other apparatuses and systems.

Now, having described various components of various exemplary strut length and pressure regulation systems for landing gear, a strut length and pressure regulation system 1 may be manufactured from various materials. In one exemplary embodiment, a strut length and pressure regulation system 1 may comprise metal. For example, a strut length and pressure regulation system 1 may comprise metal, such as titanium, aluminum, steel, or stainless steel, though it may alternatively comprise numerous other materials configured to provide support, such as, for example, composite, ceramic, plastics, polymers, alloys, glass, binder, epoxy, polyester, acrylic, or any material or combination of materials having a desired strength, stiffness, or flexibility sufficient to maintain resiliency during use. In various embodiments, various portions of strut length and pressure regulation system 1 as disclosed herein are made of different materials or combinations of materials, and/or may comprise coatings.

In various embodiments, strut length and pressure regulation system 1 may comprise multiple materials, or any material configuration suitable to enhance or reinforce the resiliency and/or support of the system when subjected to wear in an aircraft operating environment or to satisfy other desired electromagnetic, chemical, physical, or biological properties, for example radar signature, load capacity, or heat tolerance.

In various embodiments, while the pressure regulation systems described herein have been described in the context of aircraft applications; however, one will appreciate in light of the present disclosure, that the system described herein may be used in connection with various other vehicles, for example, cars, trucks, busses, trains, boats, and submersible vehicles, or any other vehicle or device, having a shock absorbing strut.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A strut length and pressure regulation system comprising:
   a pressure source comprising a gas reservoir;
   a valve configured to selectively connect the pressure source in fluidic communication with a strut; and
   a valve control apparatus configured to actuate the valve in response to position data wherein the valve comprises: a floating piston comprising a floating piston passage; a spring disposed between the floating piston and a housing; wherein the valve control apparatus comprises: the housing; a control reservoir in fluidic communication with the floating piston; an orifice in fluidic communication with the control reservoir and in fluidic communication with a strut condition feedback interconnection; wherein the strut condition feedback interconnection conveys gas from the strut to the orifice in fluidic communication with the control reservoir, wherein the floating piston is translatable in response to a pressure of the gas in the control reservoir, and wherein the floating piston passage is alignable with a first valve input interconnection and a first valve output interconnection.

2. The strut length and pressure regulation system according to claim 1, wherein the valve control apparatus comprises:
   a controller comprising a processor and a tangible, non-transitory memory;
   a position sensor in logical communication with the controller; and
   a pressure sensor in logical communication with the controller,
   wherein the position sensor provides the position data to the controller in response to a position of the strut,
   wherein the pressure sensor provides pressure data to the controller in response to a pressure of a gas in the strut,
   wherein the controller determines a valve control instruction in response to the position data.

3. The strut length and pressure regulation system according to claim 2, wherein the valve actuates in response to the valve control instruction, wherein the actuating comprises at least one of opening or closing.

4. The strut length and pressure regulation system according to claim 3, wherein the strut at least one of lengthens or contracts in response to the valve actuating.

5. The strut length and pressure regulation system according to claim 2, wherein the valve, in response to the valve control instruction, at least one of: connects the strut in fluidic communication with the pressure source, connects the strut in fluidic communication with an external environment, or isolates the strut from fluidic communication with the pressure source and the external environment.

6. The strut length and pressure regulation system according to claim 2, wherein the position sensor comprises a rotary variable differential transformer disposed at an articulating joint of an aircraft landing gear torque link comprising an upper torque link and a lower torque link.

7. A method of strut length and pressure regulation comprising:
   receiving, at a controller, a position signal;
   receiving, at the controller, a pressure signal; and
   controlling, by a valve control apparatus in electrical communication with the controller, a first strut length of a strut in response to at least one of: the position signal or the pressure signal wherein the valve comprises: a floating piston comprising a floating piston passage; a spring disposed between the floating piston and a housing; wherein the valve control apparatus comprises: the housing; a control reservoir in fluidic communication with the floating piston; an orifice in fluidic communication with the control reservoir and in fluidic communication with a strut condition feedback interconnection; wherein the strut condition feedback interconnection conveys gas from the strut to the orifice in fluidic communication with the control reservoir, wherein the floating piston is translatable in response to a pressure of the gas in the control reservoir, and wherein the floating piston passage is alignable with a first valve input interconnection and a first valve output interconnection.

8. The method of strut length and pressure regulation according to claim 7, wherein the controlling comprises:
   determining, by the controller, a strut length in response to the position signal;
   comparing, by the controller, the strut length to a lower limit and an upper limit; and operating, by the valve control apparatus in electrical communication with the controller, a valve in response to the comparing.

9. The method of strut length and pressure regulation according to claim 8, wherein the operating the valve comprises one of:
positioning, by the valve control apparatus in electrical communication with the controller, the valve to connect a pressure source to the strut in response to the strut length being below the lower limit; and
positioning, by the valve control apparatus in electrical communication with the controller, the valve to release gas from the strut in response to the strut length being above the upper limit.

10. The method of strut length and pressure regulation according to claim 8, wherein the operating the valve comprises causing, by the valve control apparatus in electrical communication with the controller, the valve to fluidically isolate the strut in response to the strut length being above the lower limit and below the upper limit.

11. The method of strut length and pressure regulation according to claim 7, wherein the controlling comprises:
determining, by the controller, a strut pressure in response to the pressure signal;
comparing, by the controller, the strut pressure to a desired pressure; and
operating, by the valve control apparatus in electrical communication with the controller, a valve in response to the comparing.

12. The method of strut length and pressure regulation according to claim 7 further comprising:
receiving, by the controller, aircraft status information;
setting, by the controller, a controller state to a ground standby state in response to the aircraft status information indicating that an aircraft landing gear is in a down position; and
setting, by the controller, the controller state to an air standby state in response to the aircraft status information indicating that the aircraft landing gear is in an up position.

13. The method of strut length and pressure regulation according to claim 12 wherein, in response to the controller state being the ground standby state, the controlling comprises:
determining, by the controller, the first strut length in response to the position signal;
comparing, by the controller, the first strut length to a lower limit and an upper limit; and
operating, by the valve control apparatus in electrical communication with the controller, a valve in response to the comparing.

14. The method of strut length and pressure regulation according to claim 12 wherein, in response to the controller state being the air standby state, the controlling comprises:
determining, by the controller, a strut pressure in response to the pressure signal;
comparing, by the controller, the strut pressure to a desired pressure; and
operating, by the valve control apparatus in electrical communication with the controller, a valve in response to the comparing.

* * * * *